United States Patent
Sato et al.

(10) Patent No.: US 10,272,645 B2
(45) Date of Patent: Apr. 30, 2019

(54) ALUMINUM-ALLOY-CLAD PLATE AND ALUMINUM-ALLOY-CLAD STRUCTURAL MEMBER

(71) Applicant: Kobe Steel, Ltd., Kobe-shi (JP)

(72) Inventors: Kazufumi Sato, Kobe (JP); Katsushi Matsumoto, Kobe (JP)

(73) Assignee: Kobe Steel, Ltd., Kobe-shi (JP)

( * ) Notice: Subject to any disclaimer, the term of this patent is extended or adjusted under 35 U.S.C. 154(b) by 96 days.

(21) Appl. No.: 15/541,540

(22) PCT Filed: Mar. 24, 2016

(86) PCT No.: PCT/JP2016/059425
§ 371 (c)(1),
(2) Date: Jul. 5, 2017

(87) PCT Pub. No.: WO2016/152984
PCT Pub. Date: Sep. 29, 2016

(65) Prior Publication Data
US 2018/0022067 A1 Jan. 25, 2018

(30) Foreign Application Priority Data

Mar. 25, 2015 (JP) ................................. 2015-063101

(51) Int. Cl.
| B32B 15/01 | (2006.01) |
| B23K 20/04 | (2006.01) |
| C22C 21/00 | (2006.01) |
| C22C 21/06 | (2006.01) |
| C22C 21/10 | (2006.01) |
| C22C 21/08 | (2006.01) |
| C22F 1/047 | (2006.01) |
| C22F 1/053 | (2006.01) |
| C22F 1/04 | (2006.01) |

(52) U.S. Cl.
CPC ............ *B32B 15/016* (2013.01); *B23K 20/04* (2013.01); *C22C 21/00* (2013.01); *C22C 21/06* (2013.01); *C22C 21/08* (2013.01); *C22C 21/10* (2013.01); *C22F 1/047* (2013.01); *C22F 1/053* (2013.01); *C22F 1/04* (2013.01)

(58) Field of Classification Search
None
See application file for complete search history.

(56) References Cited

U.S. PATENT DOCUMENTS

| 2014/0003993 A1* | 1/2014 | Matsumoto | C22C 21/02 420/534 |
| 2014/0322558 A1* | 10/2014 | Takeda | B23K 35/28 428/654 |
| 2014/0356647 A1* | 12/2014 | Takeda | C22C 21/02 428/654 |

FOREIGN PATENT DOCUMENTS

| JP | 2004-285391 A | 10/2004 |
| JP | 2002-142763 A | 6/2008 |
| JP | 2013-95980 A | 5/2013 |

* cited by examiner

*Primary Examiner* — Daniel J. Schleis
(74) *Attorney, Agent, or Firm* — Oblon, McClelland, Maier & Neustadt, L.L.P.

(57) ABSTRACT

An aluminum-alloy-clad plate which includes a plurality of superposed aluminum alloy layers and which has undergone a diffusion heat treatment. Aluminum alloy layers having specific compositions are superposed so that any adjoining two of these differ in the content of Mg or Zn, and are subjected to a diffusion heat treatment to give a structure which has fine crystal grain diameters and Mg/Zn mutual diffusion regions and which has specific DSC properties. Thus, both higher strength and high formability are imparted.

2 Claims, 2 Drawing Sheets

FIG.1

| Al-Mg ALLOY |
| Al-Zn ALLOY |
| Al-Mg ALLOY |
| Al-Zn ALLOY |
| Al-Mg ALLOY |

FIG.2

| Al-Mg ALLOY |
| Al-Zn-Mg ALLOY |
| Al-Mg ALLOY |
| Al-Zn-Mg ALLOY |
| Al-Mg ALLOY |

FIG.3

ENDOTHERMIC PEAK TEMPERATURE: 180°C
EXOTHERMIC PEAK TEMPERATURE: 240°C

FIG. 4

ENDOTHERMIC PEAK TEMPERATURE : 215°C
EXOTHERMIC PEAK TEMPERATURE : 252°C

ALUMINUM-ALLOY-CLAD PLATE AND ALUMINUM-ALLOY-CLAD STRUCTURAL MEMBER

TECHNICAL FIELD

The present invention relates to an aluminum alloy clad plate and an aluminum alloy clad structural member (hereinafter, aluminum is also referred to as Al). The clad plate is a laminate plate in which aluminum alloy layers are laminated together and are integrally bonded by rolling or the like.

BACKGROUND ART

While an aluminum alloy plate is used as a material for weight saving in a structural member of a transport machine such as an automobile body or an airframe, high alloying for high strength tends to contradict formability into the structural member.

For example, 7000-series aluminum alloy or extra super duralumin (Al-5.5% Zn-2.5% Mg alloy) for the structural member contains an increased amount of strength-increasing element such as Zn or Mg as a typical method for high strength. This however reduces ductility and thus reduces the formability into the structural member. Furthermore, such high alloying causes deterioration in corrosion resistance or an increase in strength due to room-temperature aging (age hardening) during storage. This significantly deteriorates the formability into the structural member. In addition, this leads to low production efficiency of an alloy plate in a rolling step or the like.

Such a contradiction between high strength and formability is extremely difficult to be resolved only by a composition, a microstructure, or a manufacturing method of a simple aluminum alloy plate (single alloy plate) such as the 7000-series aluminum alloy plate and the extra super duralumin plate.

An aluminum alloy clad plate (laminate plate), in which two to four aluminum alloy layers (plates) having different compositions or properties are laminated together, has been known as a measure to solve this problem.

A typical example of such an aluminum alloy clad plate includes an aluminum-alloy brazing sheet for a heat exchanger, the aluminum-alloy brazing sheet having a three or four-layered structure in which a sacrificial anode material of 7000-series aluminum alloy and a 4000-series aluminum alloy brazing material are cladded on a 3000-series aluminum alloy core.

In addition, Patent Literature 1 provides an aluminum alloy material for a vehicle fuel tank, which includes a clad material including a core made of a 5000-series aluminum alloy material for high strength and a skin material made of a 7000-series aluminum alloy material for high corrosion resistance.

Patent Literature 2 provides a method of manufacturing a clad plate, in which differences in melting point between aluminum alloys such as 1000-series, 3000-series, 4000-series, 5000-series, 6000-series, and 7000-series are used to laminate at most four aluminum alloy layers together by continuous casting with a twin roll.

Patent Literature 3 suggests that when a plurality of aluminum alloy layers are laminated together, a Cu anti-corrosion layer is provided between such aluminum alloy layers, and Cu in the Cu anti-corrosion layer is diffused into the aluminum alloy layers bonded by high-temperature heat treatment to improve corrosion resistance of the clad plate.

CITATION LIST

Patent Literature

PTL1: Japanese Unexamined Patent Application Publication No. 2004-285391
PTL2: Japanese Patent No. 5083862
PTL3: Japanese Unexamined Patent Application Publication No. 2013-95980

SUMMARY OF INVENTION

Technical Problem

However, very few of such conventional aluminum alloy clad plates solve the contradiction between high strength and formability as a material for the structural member of a transport machine. Hence, there is a technical problem to allow the aluminum alloy clad plate as a material for the structural member of a transport machine to have high strength and good formability.

To solve such a problem, an object of the present invention is to provide an aluminum alloy clad plate and an aluminum alloy clad structural member, which solve the contradiction between high strength and formability and have high strength and good formability.

Solution to Problem

To achieve the object, an aluminum alloy clad plate of the present invention is summarized by an aluminum alloy clad plate as a laminate of a plurality of aluminum alloy layers, in which each of the aluminum alloy layers laminated inside of an aluminum alloy layer on an outermost layer side of the aluminum alloy clad plate contains one or both of Mg: 3 to 10 mass % and Zn: 5 to 30 mass %, the aluminum alloy layer on the outermost layer side has a composition containing Mg in a range from 3 to 10 mass % and Zn that is limited to 2 mass % or less (including 0 mass %), the aluminum alloy layers are laminated such that aluminum alloy layers having different contents of one of Mg and Zn are adjacently bonded to each other, the total number of laminated layers is 5 to 15, and the total thickness is 1 to 5 mm, the aluminum alloy clad plate has an average content of Mg in a range from 2 to 8 mass % and an average content of Zn in a range from 3 to 20 mass %, the average content being an average of the contents of each of Mg and Zn of the laminated aluminum alloy layers, and when the aluminum alloy clad plate is subjected to diffusion heat treatment of holding for 4 hr at 500° C. followed by cooling to room temperature at a cooling rate of 80° C./sec, and subsequently subjected to artificial age hardening of 120° C.×24 hr, the aluminum alloy clad plate has a microstructure having an average grain size of 200 μm or less, the average grain size being an average of grain sizes of the laminated aluminum alloy layers, and having an Mg—Zn interdiffusion region, in which Mg and Zn interdiffuse between the laminated aluminum alloy layers, and a differential scanning calorimetry curve of the aluminum alloy clad plate shows an endothermic peak at a temperature of 190° C. or lower and an exothermic peak within a temperature range from 220 to 250° C.

To achieve the object, an aluminum alloy clad structural member of the present invention is summarized in that the structural member is produced by press-forming the above-described aluminum alloy clad plate and performing diffusion heat treatment and artificial aging on the press-formed aluminum alloy clad plate, a microstructure of the aluminum alloy clad structural member has an average grain size of 200 µm or less, the average grain size being an average of grain sizes of the laminated aluminum alloy layers, and has an Mg—Zn interdiffusion region, in which Mg and Zn interdiffuse between the laminated aluminum alloy layers, and a differential scanning calorimetry curve of the structural member shows an endothermic peak at a temperature of 190° C. or lower and an exothermic peak in a temperature range from 220 to 250° C.

Advantageous Effects of Invention

In the present invention, on the assumption of the above-described number of layers and plate thickness, the aluminum alloy layers to be cladded each have a specific composition containing a large amount of Mg and Zn in order to allow the aluminum alloy clad plate to have high strength and good formability. As a result, ductility of a material clad plate is increased to secure the press formability into the structural member. In this stage, the material clad plate is not necessary to be increased in strength because press formability is rather deteriorated.

After that, the material clad plate is press-formed into a structural member, and then Mg and Zn contained in the cladded aluminum alloy layers are diffused by the diffusion heat treatment between the microstructures of the laminated plates. Through such element diffusion, a new composite precipitate (age precipitate) including Mg, Zn, or Cu is precipitated at a bonding interface between the aluminum alloy layers to increase strength. In this respect, the specific composition, which contains a large amount of Mg or Zn, of each aluminum alloy layer to be cladded is not only defined from the viewpoint of ductility but also defined to allow the composite precipitate caused by the element diffusion to be precipitated at the bonding interface to achieve high strength.

In the present invention, it is assumed that the aluminum alloy clad structural member produced by forming of the aluminum alloy clad plate is subjected to diffusion heat treatment to achieve high strength through exhibition of such an element diffusion mechanism.

The aluminum alloy clad structural member is subjected to the diffusion heat treatment, or subjected to the diffusion heat treatment followed by artificial aging (hereinafter, also referred to as T6 treatment), or subjected to the diffusion heat treatment, followed by the artificial aging, followed by further artificial aging (age hardening) such as paint-bake treatment. Such an aluminum alloy clad structural member is increased in proof stress (strength) by the artificial aging, and has good bake hardenability (hereinafter, also referred to as BH property) being paint-bake hardenability or artificial age hardenability, which provides a required strength.

In the present invention, the composite precipitate at a nanometer (nm: 1/1000 µm) level caused by the element diffusion is dispersed as a microstructure of the aluminum alloy clad plate (aluminum alloy clad structural member) subjected to the diffusion heat treatment or subjected to the diffusion heat treatment followed by the artificial age hardening (T6 treatment) in order to secure the high strength (BH property) due to such a BH property.

However, such a fine precipitate is difficult to be directly measured by a common TEM or the like for the aluminum alloy clad plate or the aluminum alloy clad structural member, in which element concentration distribution varies due to the element diffusion.

Hence, the present invention indirectly defines the microstructure having the fine precipitate with temperature ranges having a distinct endothermic peak and a distinct exothermic peak on a differential scanning calorimetry curve of the aluminum alloy clad plate or the aluminum alloy clad structural member.

Consequently, the present invention allows the aluminum alloy clad plate, which is subjected to diffusion heat treatment so as to be used as the structural member, to have high strength and good formability.

DESCRIPTION OF EMBODIMENTS

Figure 1:
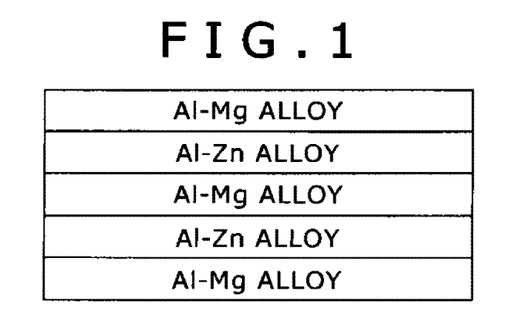
FIG. 1 is a sectional view illustrating an embodiment of the clad plate of the present invention.
Figure 2:
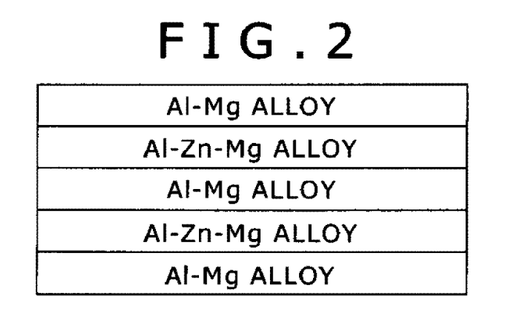
FIG. 2 is a sectional view illustrating another embodiment of the clad plate of the present invention.

Best modes for carrying out the aluminum alloy clad plate (hereinafter, also simply referred to as clad plate) and the aluminum alloy clad structural member (hereinafter, also simply referred to as clad structural member) of the present invention, the clad structural member being produced by forming of the clad plate used as a material, are now described with reference to FIGS. 1 and 2. FIGS. 1 and 2 each merely show a section of part of the clad plate of the present invention in a width or rolling (longitudinal) direction. Such a sectional structure extends evenly (uniformly) over the width or rolling direction of the entire clad plate of the present invention.

In the following description of one embodiment of the present invention, a plate before being cladded is referred to as aluminum alloy plate. When such aluminum alloy plates are cladded and thinned by rolling so as to be produced into a clad plate, a layer of the clad plate is referred to as aluminum alloy layer.

Hence, the meaning of definition of a composition or a lamination way of the aluminum alloy layer of the clad plate may be considered as the same meaning of definition of that of an aluminum alloy plate or a slab before being cladded.

Lamination Way of Clad Plate

In the clad plate of the present invention, 5 to 15 aluminum alloy layers (sheets) are laminated (cladded) together in such a manner that each aluminum alloy layer contains one or both of Mg and Zn in a defined range, and adjacent aluminum alloy layers have different contents of one of Mg and Zn. The aluminum alloy clad plate is relatively thin, i.e., the total thickness of the clad plate as a laminate is in a range from 1 to 5 mm.

In the clad plate of the present invention, a lamination way must be varied depending on compositions of the aluminum alloy layers to be combined for lamination. Such a lamination way is described with reference to FIGS. 1 and 2.

FIG. 1 shows an example, in which an Al—Mg alloy plate (aluminum alloy layer such as A in Table 1 as described later) is disposed as each of the aluminum alloy layers (two outermost layers) on the outermost layer side, an Al—Zn alloy plate (aluminum alloy layer such as D or E in Table 1 as described later) is laminated inside of each outermost layer, and an Al—Mg alloy plate (aluminum alloy layer such as A in Table 1 as described later) is disposed in the middle, i.e., the five layers in total are laminated together.

FIG. 2 also shows an example, in which an Al—Mg alloy plate (aluminum alloy layer such as A in Table 1 as described later) is disposed as each of the aluminum alloy layers (two outermost layers) on the outermost layer side, an Al—Zn—Mg alloy plate is laminated inside of each outermost layer, and an Al—Mg alloy plate (aluminum alloy layer such as A in Table 1 as described later) is disposed in the middle, i.e., the five layers in total are laminated together.

FIGS. 1 and 2 each show the example of the present invention, in which plates to be laminated to each other are aluminum alloy layers which each contain one or both of Mg and Zn in the defined content range, and have different contents of at least one of Mg and Zn.

Among such aluminum alloy layers to be combined, each of the Al—Zn aluminum alloy layer in FIG. 1 and the Al—Zn—Mg aluminum alloy layer in FIG. 2, which contains Zn in the defined content range, has a poor corrosion resistance, and is therefore laminated on an inner side of the clad plate to maintain corrosion resistance of the clad plate. If each of such aluminum alloy layers containing Zn is laminated on an outer side (surface side) of the clad plate, the clad plate and in turn the clad structural member are deteriorated in corrosion resistance because of the high Zn content.

In FIGS. 1 and 2, therefore, a clad plate containing Mg in the above-described content range (3 to 10 mass %), such as an Al—Mg system, is laminated as the aluminum alloy layer on each of the outermost layer sides (both outermost sides, both surface sides) of the clad plate. However, if such an Al—Mg system contains Zn or Cu in addition to Mg, corrosion resistance is also deteriorated. In the aluminum alloy layer, therefore, Zn must be limited to 2 mass % or less (including 0%) so that corrosion resistance is not significantly deteriorated.

As the number of layers to be laminated (the number of slabs or plates, the number of laminated layers as described later) is larger, the properties of the clad plate are more effectively exhibited, and at least five layers (sheets) are necessary to be laminated. For four layers or less, even if a lamination way is devised, a relatively thin aluminum alloy clad plate having a thickness in a range from 1 to 5 mm is not significantly different in properties from a simple plate (single plate), and thus there is no meaning in such lamination. On the other hand, when more than 15 layers (15 sheets) are laminated, the properties of the clad plate are promisingly more improved. This however is inefficient and impractical in light of productivity in an actual manufacturing process. Hence, at most about 15 layers should be laminated.

Manufacturing Method of Clad Plate

There is described a method of manufacturing the clad plate of the present invention before being subjected to the diffusion heat treatment.

For a typical simple plate (single plate), if the 7000-series or the like is high-alloyed so as to contain Mg of at most 10 mass % or Zn of at most 30 mass % as in the present invention, ductility is extremely reduced and a rolling crack occurs, so that rolling cannot be performed. In contrast, in the present invention, since a laminate plate (laminate slab) includes thin plates that have different compositions, even if the laminate plate is high-alloyed as described above, ductility is high. Hence, the laminate plate can be hot-rolled and cold-rolled into a thin clad. That is, the clad plate of the present invention before being subjected to the diffusion heat treatment can be advantageously manufactured as a rolled clad plate by a typical rolling step.

Hence, 5 to 15 aluminum alloy slabs or plates, which each contain one or both of Mg and Zn in a defined range while having different contents of one of Mg and Zn, are laminated (cladded) before being rolled into a clad plate. As with a typical rolling step, such a laminate may be subjected to homogenization as necessary before being hot-rolled into a clad plate.

If the clad plate is further thinned in the above-described thickness range, the clad plate is further cold-rolled while being subjected to process annealing as necessary. The rolled clad plate is subjected to tempering (heat treatment such as annealing or solution treatment) to manufacture the clad plate of the present invention.

It is also allowable that the aluminum alloy slabs are separately subjected to homogenization, and then are laminated together and reheated to a hot-rolling temperature before being hot-rolled. Alternatively, the following process is also allowable: The aluminum alloy slabs are separately subjected to homogenization and then separately hot-rolled, and are separately subjected to process annealing or cold rolling as necessary so as to be separately produced into plates each having an appropriate thickness, and then the plates are laminated together into a plate material that is then cold-rolled into a clad plate.

The reason why the total thickness of the clad plate of the present invention is within a relatively small range from 1 to 5 mm is because the range corresponds to a thickness range generally used in the structural member of the transport machine. If the thickness is less than 1 mm, the clad plate does not meet the required properties such as stiffness, strength, workability, and weldability necessary for the structural member. If the thickness exceeds 5 mm, the clad plate is difficult to be press-formed into the structural member of the transport machine. In addition, lightweight, which is necessary for the structural member of the transport machine, is not achieved due to weight increase.

The thickness (plate thickness) of the slab is about 50 to 200 mm depending on the number of sheets (layers) to be laminated or on reductions so that the total thickness 1 to 5 mm of the final clad plate is achieved by the rolling clad method. When the total thickness of the final clad plate is 1 to 5 mm, thickness of each of the laminated alloy layers is about 0.05 to 2.0 mm (50 to 2000 µm) depending on the number of sheets (layers) to be laminated.

In another process, the individual plates are singly subjected to homogenization, hot rolling, and cold rolling as necessary, and then are laminated into a clad plate in a cold rolling step. In such a process, thickness of each plate material being laminated is about 0.5 to 5.0 mm depending on the number of sheets (layers) to be laminated or reductions.

Aluminum Alloy

The composition of the aluminum alloy layer laminated inside the outermost layer of the clad plate before being subjected to the diffusion heat treatment (before being produced into the structural member) contains one or both of Mg: 3 to 10 mass % and Zn: 5 to 30 mass %. In other words, the aluminum alloy plate or slab before being cladded (laminated) or the cladded aluminum alloy layer has a composition containing one or both of Mg: 3 to 10 mass % and Zn: 5 to 30 mass %.

The respective average contents of Mg and Zn of the entire aluminum alloy clad plate before being subjected to diffusion heat treatment (before being formed into the structural member) are in ranges of Mg: 2 to 8 mass % and Zn: 3 to 20 mass %, where the average contents are each an average of the contents of Mg or Zn of the laminated aluminum alloy layers.

The aluminum alloy layers (plates), which have the above-described composition while having different contents of at least one of Mg and Zn, are laminated to each other. In addition, the entire aluminum alloy clad plate contains Mg and Zn in the above-described respective content ranges. These are necessary for aluminum alloy clad plate to have formability and strength.

Composition of Aluminum Alloy Layer Laminated inside Outermost Layer

Such an aluminum alloy layer containing one or both of Mg: 3 to 10 mass % and Zn: 5 to 30 mass % may include a binary aluminum alloy such as an Al—Zn system and an Al—Mg system. The binary aluminum alloy may further contain at least one of selective additional elements Zn, Mg, Cu, Zr, and Ag. That is, the aluminum alloy layer may include a ternary system such as an Al—Zn—Mg system, an Al—Zn—Cu system, and an Al—Mg—Cu system, a quaternary system such as an Al—Zn—Cu—Zr system, and a quantic system such as an Al—Zn—Mg—Cu—Zr system.

A predetermined number of such aluminum alloy layers are combined and laminated together such that the aluminum alloy layers having different contents of one of Mg and Zn are adjacently bonded to each other, and the entire clad plate contains Mg, Zn, and at least one of the selective additional elements Cu, Zr, and Ag as necessary in the above-described respective average content ranges.

The reason why the elements as components of the aluminum alloy layers to be cladded or the clad plate are contained or limited is now individually described. In the case of the components of the clad plate, the content of each element is considered as an average of the contents of each element of plates (all plates) to be laminated instead of an average of the contents of each element of the aluminum alloy layers. In the following, the percentage representing the content refers to mass percent.

Mg: 3 to 10%

Mg is an indispensable alloy element, and forms, with Zn, a cluster (fine precipitate) in the microstructure of the clad plate or the clad structural member, and thus improves work hardenability. In addition, Mg forms an age precipitate in the microstructure or a bonding interface of the clad plate or the clad structural member. The Mg content of less than 3% results in insufficient strength. The Mg content of more than 10% causes a casting crack, and results in a deterioration in rolling performance of the clad plate (slab), making it difficult to manufacture the clad plate.

Zn: 5 to 30%

Zn is an indispensable alloy element, and forms, with Mg, a cluster (fine precipitate) in the microstructure of the clad plate or the clad structural member, and thus improves work hardenability. In addition, Zn forms an age precipitate in the microstructure or the bonding interface of the clad plate or the clad structural member, and thus increases strength. The Zn content of less than 5% results in insufficient strength, and leads to imbalance between strength and formability. If the Zn content exceeds 30%, a casting crack occurs, and rolling performance of the clad plate (slab) is deteriorated, making it difficult to manufacture the clad plate. Even if the clad plate can be manufactured, the amount of an intergranular precipitate $MgZn_2$ increases and thus intergranular corrosion easily occurs, leading to extreme deterioration in corrosion resistance and deterioration in formability.

One or More of Cu, Zr, and Ag

Cu, Zr, and Ag are equieffective elements that each increase strength of the clad plate or the clad structural member while having differences in action mechanism therebetween, and are contained as necessary.

Cu exhibits the effect of increasing strength and an effect of improving corrosion resistance. A small content of Zr exhibits an effect of increasing strength through refining grains of the slab and the clad plate. A small content of Ag exhibits an effect of increasing strength through refining an age precipitate produced in the microstructure or the bonding interface of the clad plate or the clad structural member. However, if the content of each of Cu, Zr, and Ag is excessively large, manufacturing of the clad plate is difficult. Even if the clad plate can be manufactured, various problems occur, such as deterioration in corrosion resistance including stress corrosion cracking (SCC) resistance, and deterioration in ductility or a strength characteristic. Hence, when such elements are selectively contained, the contents are defined as follows: Cu: 0.5 to 5 mass %, Zr: 0.3 mass % or less (not including 0%), and Ag: 0.8 mass % or less (not including 0%).

Other Elements:

Elements other than the described elements consist of inevitable impurities. Such impurity elements are assumed (allowed) to be contaminated due to use of aluminum alloy scraps as a melting material in addition to pure aluminum metal, and are thus allowed to be contained. Specifically, if the contents of the impurity elements are as follows: Fe: 0.5% or less, Si: 0.5% or less, Li: 0.1% or less, Mn: 0.5% or less, Cr: 0.3% or less, Sn: 0.1% or less, and Ti: 0.1% or less, ductility and a strength characteristic of the clad plate of the present invention are not deteriorated, and the impurity elements are allowed to be contained.

Composition of Entire Clad Plate

The present invention defines the composition of the aluminum alloy layer, and further defines the average contents of Mg and Zn as an average composition of the entire clad plate before the diffusion heat treatment.

The average contents of Mg and Zn of the entire clad plate are obtained in terms of weighted arithmetic means determined through assigning respective weights corresponding to the clad ratios to the contents of Mg and Zn of each of the laminated aluminum alloy layers. The average contents of Mg and Zn of the entire clad plate, which are each obtained as the weighted arithmetic mean, are defined to be Mg: 2 to 8 mass % and Zn: 3 to 20 mass %.

Specifically, the average composition of the entire clad plate is defined to contain one or both of Mg and Zn in the defined average content range, and selectively contain one or more of Cu, Zr, and Ag, the remainder consisting of aluminum and inevitable impurities.

The average content of Mg or Zn of the entire clad plate is determined in terms of a weighted arithmetic mean obtained through assigning a weight corresponding to a clad ratio of each aluminum alloy layer of the clad plate to the content of Mg or Zn of aluminum alloy configuring that aluminum alloy layer. In an example of the clad ratio, when a five-layered aluminum alloy clad plate includes aluminum alloy layers having the same thickness, any of the aluminum alloy layers has a clad ratio of 20%. The weighted arithmetic mean of the content of Mg or Zn is calculated using the clad ratio, and determined as the average content of Mg or Zn of the entire clad plate.

When each of the average contents of Mg and Zn as the average composition of the entire clad plate is excessively small to be less than the lower limit, Mg and Zn each insufficiently interdiffuse between the microstructures of the laminated plates subjected to the diffusion heat treatment of 500° C.×4 hr. As a result, such insufficient diffusion causes an insufficient amount of the new composite precipitate (age precipitate) including Mg and Zn in the bonding interface between the plates. Hence, the total thickness in the thickness direction of the Mg—Zn interdiffusion region, in which concentration of each of Mg and Zn is within a range from 30 to 70%, becomes less than 40% of the thickness of the aluminum alloy clad plate, and thus the aluminum alloy clad plate cannot be increased in strength. Specifically, the aluminum alloy clad structural member, which is produced through the diffusion heat treatment and the artificial aging of the aluminum alloy clad plate, cannot have a certain strength, or 0.2% proof stress of 400 MPa or more.

When the average content of each of Mg and Zn as the average composition of the entire clad plate is excessively large to exceed the upper limit, ductility of the clad plate is extremely reduced. Hence, press formability is reduced to a level equivalent to a level of the 7000-series aluminum alloy plate, the extra super duralumin plate, a 2000-series aluminum alloy plate, or an 8000-series aluminum alloy plate for the structural member, and thus there is no meaning in such a clad plate.

The present invention intentionally provides an alternative to the aluminum alloy plate for the structural member, including 7000-series, extra super duralumin (Al-5.5% Zn-2.5% Mg alloy), 2000-series, and 8000-series. Specifically, the present invention mainly aims at greatly improving ductility of such a high-strength material in a stage of the clad plate as a forming material, and increasing strength of the formed structural member to a level similar to that of the existing high-strength material including a single plate by the diffusion heat treatment and the artificial aging. Hence, as the composition of the entire clad plate, a final composition of the clad plate must be equal or similar to a composition of the 7000-series aluminum alloy plate, the extra super duralumin plate, the 2000-series aluminum alloy plate, or the 8000-series aluminum alloy plate for the structural member.

From such a viewpoint, therefore, it is of significance that the composition of the clad plate of the present invention is made similar to that of a single plate of the existing aluminum alloy plate for the structural member, including 7000-series, extra super duralumin, 2000-series, and 8000-series. Specifically, it is of significance that the clad plate contains one or both of Mg and Zn, which are major elements of the existing aluminum alloy plate, in ranges of Mg: 3 to 10 mass % and Zn: 5 to 30 mass %.

In this regard, the clad plate or the aluminum alloy layer of the present invention may contain Si and/or Li that are selectively contained in the composition of the existing aluminum alloy plate.

Element Interdiffusion Microstructure of Clad Plate

In the present invention, the aluminum alloy clad plate, which is improved in formability by designing an alloy composition itself or a combination of alloy compositions as described above, is press-formed into the structural member as a use of the aluminum alloy clad plate, and then the structural member is subjected to the diffusion heat treatment to be increased in strength. Although the aluminum alloy clad plate can be barely formed into the structural member after being subjected to the diffusion heat treatment and increased in strength, forming is considerably difficult and requires a huge amount of effort.

Mg and Zn contained in the respective cladded aluminum alloy layers are allowed to interdiffuse between the laminated (bonded) aluminum alloy layers by the diffusion heat treatment. Through such element interdiffusion, the new Zn—Mg fine composite precipitate (age precipitate) including Mg and Zn is densely precipitated in a bonding interface between the aluminum alloy layers so that interfacial microstructure control (ultrahigh-density dispersion of nano-level fine precipitates) is performed. Consequently, the clad plate (structural member) can be increased in strength after being subjected to the diffusion heat treatment and preferably further subjected to the artificial aging.

Hence, the element interdiffusion microstructure of the aluminum alloy clad plate of the present invention is a microstructure of the aluminum alloy clad plate subjected to the diffusion heat treatment as defined in claims of this application together with the average grain size of the aluminum alloy layer. Actually, the element interdiffusion microstructure is a microstructure of the structural member produced by forming of the aluminum alloy clad plate.

To allow the microstructure to be determined in a phase of a microstructure of the material aluminum alloy clad plate, the present invention defines the microstructure as an element interdiffusion microstructure (Mg—Zn interdiffusion region) or average grain size when the aluminum alloy clad plate is subjected to the diffusion heat treatment.

Specifically, the present invention defines the Mg—Zn interdiffusion region and the average grain size when the aluminum alloy clad plate is subjected to the diffusion heat treatment as an experiment in a sense as described later in Example, so that the microstructure of the structural member can be determined and evaluated in a stage of the material aluminum alloy clad plate even if the diffusion heat treatment is not performed on the formed structural member.

It is prerequisite that the aluminium alloy layers to be laminated contain one or both of Mg and Zn in a defined range, and have different contents of at least one of Mg and Zn in order to allow Mg and Zn contained in the aluminium alloy layers to interdiffuse between adjacent laminated aluminium alloy layers.

Specifically, if the aluminium alloy layers have the same contents of Mg and Zn, Mg—Zn interdiffusion between the bonded layers does not occur even if the respective contents of other elements are different; hence, the new fine composite precipitate (age precipitate) including Mg and Zn cannot be densely precipitated in the bonding interface between the layers, so that high strength is not achieved.

The aluminium alloy layers to be cladded are defined to have the specific composition containing a large amount of Mg and/or Zn, and the aluminium alloy layers to be laminated and bonded to each other are defined to have different contents of at least one of Mg and Zn. Such definitions are not only made from the viewpoint of ductility, but also made to allow the composite precipitate caused by the element diffusion to be precipitated in the bonding interface between the layers by the diffusion heat treatment to achieve high strength.

The present invention secures high strength through exhibition of such a mechanism. To achieve this, the concentration distribution in a thickness direction of Mg and Zn of the aluminum alloy clad plate (or the structural member), which is subjected to the diffusion heat treatment, is defined in such a manner that an average grain size of the laminated aluminum alloy layers is 200 μm or less as described later. In addition, the Mg—Zn interdiffusion region, in which Mg and Zn interdiffuse between the laminated aluminum alloy layers, is provided.

Average Grain Size

The structural member (or the clad plate), which is subjected to the diffusion heat treatment followed by the artificial age hardening (T6 treatment), is designed to include fine grains having an average grain size of 200 μm or less, the average grain size being an average of grain sizes (at the thickness center) of the laminated aluminum alloy layers. In other words, the grains are prevented from being coarsened even after the diffusion heat treatment.

Specifically, if the average grain size as an average of all grain sizes of the laminated aluminum alloy layers (at the thickness center) exceeds 200 μm, most of the grain sizes of the laminated aluminum alloy layers are so large as to exceed 200 μm.

As a result, when the aluminum alloy clad structural member is produced through performing the T6 treatment and paint baking on the clad plate including the laminated aluminum alloy layers, the aluminum alloy clad structural member cannot have the 0.2% proof stress of 400 MPa or more.

When the clad plate of the present invention or each of the aluminum alloy layers to be combined for lamination has a large thickness, the average grain size for one aluminum alloy layer less contributes to strength and formability. In the present invention, however, 5 to 15 aluminum alloy layers (sheets) are laminated (cladded) together, and the clad plate as a laminate is thin, i.e., has a total thickness of 1 to 5 mm; hence, the average grain size for one aluminum alloy layer significantly contributes to strength and formability.

Differential Scanning calorimetry Curve

In the present invention, the aluminum alloy clad structural member is subjected to the diffusion heat treatment so as to be increased in strength through element interdiffusion, and is further subjected to the artificial aging or the paint baking so as to be improved in BH property. In the present invention, therefore, it is assumed that the aluminum alloy clad structural member is subjected to diffusion heat treatment followed by artificial aging or paint-bake hardening.

The present invention is based on a metallurgical design idea to secure high strength (BH property) caused by such artificial aging or bake hardening through paint-bake hardening. In the design idea, it is intended that a fine composite precipitate at a nanometer (nm: 1/1000 μm) level produced by the element diffusion is dispersed as a microstructure of the aluminum alloy clad structural member (aluminum alloy clad plate) subjected to the diffusion heat treatment followed by the artificial age hardening (T6 Treatment).

For the aluminum alloy clad plate or the aluminum alloy clad structural member, however, concentration distribution of an element varies in a thickness direction due to the element diffusion, and thus a distribution state of the fine composite precipitate varies depending on measurement sites, so that the fine composite precipitate is extremely difficult to be directly measured by common TEM or the like. Even if the fine composite precipitate is measured, whether such a measurement value represents the aluminum alloy clad plate or the aluminum alloy clad structural member, or whether the measurement value correlates with high strength given by the BH property is not clear.

Hence, the present invention indirectly defines the microstructure having the fine precipitate by the respective temperature ranges having a distinct endothermic and exothermic peaks appearing on a differential scanning calorimetry curve (hereinafter, also referred to as DSC) of the aluminum alloy clad plate or the aluminum alloy clad structural member.

The present invention uses such temperature ranges as a guarantee or a criterion to achieve the metallurgical design idea that allows the aluminum alloy clad plate, which is to be subjected to the diffusion heat treatment and used as the aluminum alloy clad structural member, to have high strength and good formability.

Figure 3:
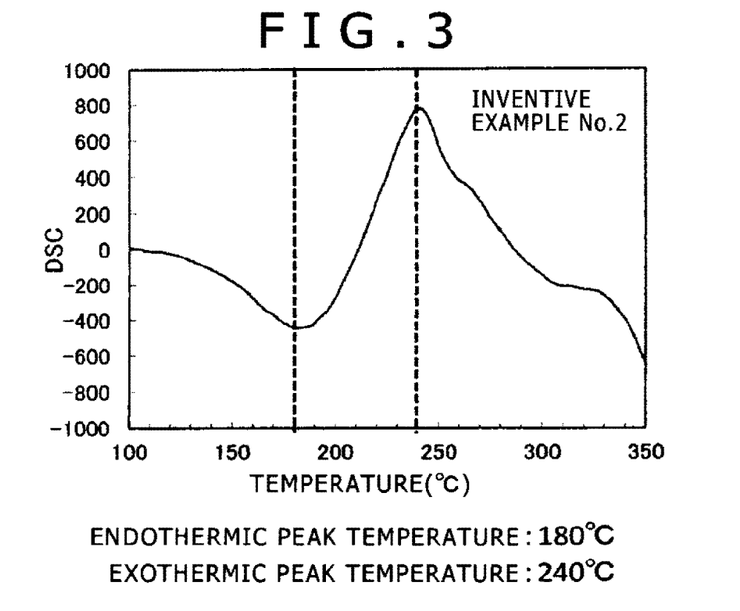
FIG. 3 is an explanatory diagram illustrating DSC of an inventive example of Example.

In the present invention, to improve the BH property of the aluminum alloy clad structural member, it is designed that the endothermic peak is at a temperature of 190° C. or lower, and the exothermic peak is in a temperature range from 220 to 250° C. as shown in FIG. 3 (inventive example 2 in Table 2) in the Example described later.

In the present invention, it is further designed that the BH property of the clad structural member is secured using the material aluminum alloy clad plate before being formed into the clad structural member. The material aluminum alloy clad plate is therefore subjected to heat treatment simulating the diffusion heat treatment and the artificial age hardening for the clad structural member, and the BH property is secured using temperature positions of an endothermic peak and an exothermic peak on a differential scanning calorimetry curve obtained during such heat treatment.

Specifically, it is designed that the material aluminum alloy clad plate is subjected to one-point T6 treatment, which includes diffusion heat treatment of holding for 4 hr at 500° C. followed by cooling to room temperature at a cooling rate of 80° C./sec and artificial age hardening of 120° C.×24 hr, and the treated material aluminum alloy clad plate shows the DSC on which the endothermic peak is at a temperature of 190° C. or lower and the exothermic peak is in a temperature range from 220 to 250° C.

To reproducibly perform such evaluation in the material stage, the material aluminum alloy clad plate must be subjected to the T6 treatment under the one-point condition: The diffusion heat treatment of holding for 4 hr at 500° C. followed by cooling to room temperature at the cooling rate of 80° C./sec and the subsequent artificial age hardening of 120° C.×24 hr.

If conditions of the diffusion heat treatment and the artificial age hardening are not narrowed to one condition, reproducibility is not given because the respective temperature positions of the endothermic peak and the exothermic peak on a resultant differential scanning calorimetry curve greatly vary depending on conditions of the diffusion heat treatment and the artificial age hardening.

As described above, the material aluminum alloy clad plate or the clad structural member having a good BH property can be produced by controlling the endothermic and exothermic peak temperatures on DSC.

This is estimated to be because the peak temperature of the endothermic peak is controlled to be within a temperature range of 190° C. or lower, thereby a precipitate (metastable phase) existing after the diffusion heat treatment is melted during the artificial aging or paint baking, and then the new precipitate (stable phase) is precipitated, leading to high strength.

Figure 4:
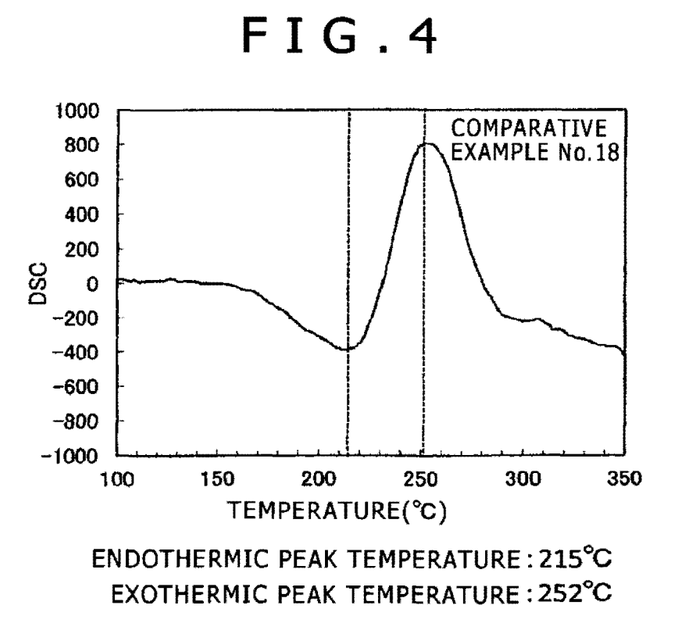
FIG. 4 is an explanatory diagram illustrating DSC of a comparative example of the Example.

On the other hand, it is estimated that as shown in FIG. 4 (comparative example 18 in Table 2) in the Example described later, when the endothermic peak is higher than 190° C., the precipitate (metastable phase) existing after the diffusion heat treatment is not melted during the artificial age hardening or the paint baking, and the precipitate is directly coarsened, leading to a reduction in strength.

A tendency of such a reduction in strength due to coarsening of the precipitate may be found when a single plate of typical 7000-series aluminum alloy is subjected to artificial aging. This reveals that the effect of improving the BH property through control of the peak temperatures on DSC of the present invention is unique to the aluminum alloy clad plate or the clad structural member of the present invention unlike the single plate of the existing 7000-series aluminum alloy.

As shown in FIG. 4 (comparative example 18 in Table 2) in the Example described later, when the peak temperature of the exothermic peak is higher than 250° C., a growth rate of the new precipitate becomes lower, and thus strength is reduced. When the peak temperature of the exothermic peak is lower than 220° C., the new precipitate is coarsened because of a high growth rate thereof, and thus strength is also reduced.

Diffusion Heat Treatment

As described above, the microstructure of the clad structural member (or clad plate) is designed to have the average grain size, which is an average of grain sizes of the laminated aluminum alloy layers, of 200 µm or less, and the Mg—Zn interdiffusion region having a thickness equal to or larger than the specific thickness to secure high strength. To achieve such a microstructure, the structural member or the clad plate must be subjected to the diffusion heat treatment under a preferred condition. In this regard, the structural member (or clad plate) is heated in a heat treatment furnace so as to be standardly subjected to the diffusion heat treatment under a condition selected from a condition range of holding for 0.1 to 24 hr at a temperature of 470 to 550° C.

It is, however, natural that a degree of Mg—Zn interdiffusion between the aluminum alloy layers due to the diffusion heat treatment, or the average grain size after the diffusion heat treatment greatly varies depending on compositions, the number, and combinations of the aluminum alloy layers to be laminated.

Hence, the temperature may be too low or the holding time may be too short even within the above-described condition range depending on the condition of the aluminum alloy layers to be laminated, and thus Mg—Zn interdiffusion between the aluminum alloy layers may become insufficient, leading to a thin (small) Mg—Zn interdiffusion region. As a result, high strength may not be achieved.

Conversely, the temperature or the holding time of the diffusion heat treatment may be too high or too long even within the above-described condition range depending on the condition of the aluminum alloy layers to be laminated, and thus the average grain size of the aluminum alloy layers may be increased, so that the average grain size cannot be adjusted to 200 µm or less. As a result, high strength may also not be achieved.

It is therefore necessary to determine (select) and precisely control the optimum condition of temperature or time of the diffusion heat treatment depending on compositions of the aluminum alloy layers to be laminated, the number of laminated layers, and combinations of layers to be laminated, as shown in the Example described later.

Artificial Aging

The clad structural member (or clad plate) subjected to the diffusion heat treatment as described above is preferably subjected to artificial aging (artificial age hardening) so as to be further increased in strength.

With such an increase in strength, the present invention defines the strength after the artificial aging of 0.2% proof stress of 400 MPa or more as a criterion of the increase in strength of the aluminum alloy clad structural member produced by press-forming the clad plate.

Hence, the conditions of temperature and time of the artificial aging are determined based on desired strength, strength of the material clad plate, or a degree of progress of room-temperature aging before the artificial aging after manufacturing of the clad plate.

To exemplify a preferred condition of the artificial aging, one-step aging is performed for 12 to 36 hr at 100 to 150° C. (including an overaging region). For a two-step process, the condition of the first step is selected from a condition range including heat treatment temperature of 70 to 100° C. and holding time of 2 hr or more, and the condition of the second step is selected from a condition range including heat treatment temperature of 100 to 170° C. and holding time of 5 hr or more (including an overaging region).

The Mg—Zn interdiffusion region, the element interdiffusion microstructure, and the average grain size of the aluminum alloy layer, which are defined for the aluminum alloy clad plate or the structural member of the present invention, are each substantially not varied by the artificial aging in such a condition range. Consequently, the thickness of the Mg—Zn interdiffusion region and the average grain size of the aluminum alloy layer, which are defined for the aluminum alloy clad plate or the structural member of the present invention, may be measured after the diffusion heat treatment or after the artificial aging following the diffusion heat treatment.

Paint Baking

The paint baking of the clad structural member (or clad plate) may be performed within a typical condition range, i.e., performed for 20 to 30 min at 160 to 210° C.

EXAMPLE

The present invention is now described in detail with Example.

Aluminum alloy clad plates shown in Tables 1 and 2 were manufactured, in each of which various aluminum alloy layers were laminated and subjected to the specific T6 treatment to simulate the clad structural member.

With a microstructure of each of the aluminum alloy clad plates, average grain size (pm) as an average of grain sizes of the laminated aluminum alloy layers, presence of the Mg—Zn interdiffusion region, in which Mg and Zn interdiffused between the laminated aluminum alloy layers, and the endothermic peak position (° C.) and the exothermic peak position (° C.) on the DSC were measured.

Furthermore, mechanical properties and BH properties of such aluminum alloy clad plates were measured and evaluated.

Table 2 shows the results.

The aluminum alloy clad plates were specifically manufactured as follows.

Aluminum alloy slabs having alloy compositions shown in Table 1 were melted and casted. The casted slabs were separately subjected to homogenization, hot rolling, and cold rolling as necessary in the usual manner to produce plate materials that were adjusted to have the same thickness of 1 mm such that all clad ratios were equal in correspondence to the number of laminated layers.

Such plate materials were laminated together in various combinations shown in Table 2. The laminated plate materials were reheated at 400° C. for 30 min, and then produced into clad hot-rolled plates by a rolling clad method in which hot rolling was started at the reheating temperature.

Such clad hot-rolled plates were each cold-rolled while being further subjected to process annealing of 400° C.×1 sec, and thus produced into clad plates each having a clad thickness (total thickness of the layers) shown in Table 2.

When the clad plate had a total thickness of 1 to 5 mm, each of the laminated alloy plates roughly had a thickness in a range from 0.1 to 2.0 mm (100 to 2000 μm). The clad plate was manufactured such that thicknesses (clad ratios) of the aluminum alloy layers were equal to one another as described before.

The clad plate of each example was subjected to heat treatment, in which the clad plate was heated at an average heating rate of 4 ° C./min and held for 2 hr at an achieving temperature of 400° C., and then cooled at a cooling rate of 20 ° C./sec. Subsequently, the clad plate was held at room temperature for one week (room-temperature aging). Subsequently, elongations (%) of the manufactured clad plates were examined by a room-temperature tensile test as described later. Table 2 shows the results.

Furthermore, the manufactured aluminum alloy clad plates were assumed (simulated) to be used as the structural members and subjected to diffusion heat treatment, in which each clad plate was held for 4 hr at 500° C. and then cooled to room temperature at a cooling rate of 80 ° C./sec, and then were in common held for one week at room temperature and then subjected to the artificial aging (T6 treatment) of 120° C.×24 hr. Samples were taken from the aluminum alloy clad plates subjected to the T6 treatment.

The column of the aluminum alloy clad plate in Table 2 shows average content of each of Mg and Zn in the entire aluminum alloy clad plate, the total lamination number of plates in Table 1, and thickness, and further shows a type of the aluminum alloy layers (plates) of A to K listed in Table 1 in the form of a combination of the laminated plates in order from a top to a bottom of each laminate.

For example, some clad plates have 5, 11, and 13 odd layers that are laminated in order of ADADA, BEBEB, CFCFC, and the like. In each of the clad plates, the aluminum alloy layer A, B, or C in Table 1 is laminated on either outer side (either of the top and bottom sides) of the clad plate, and the aluminum alloy layer D, E, F, G, H, or I in Table 1 is laminated on an inner side of the clad plate.

Average Composition

The content of each of Mg and Zn as the average composition of each aluminum alloy clad plate listed in Table 2 was calculated in terms of a weighted arithmetic mean assuming any clad aluminum alloy layer had an equal clad ratio corresponding to the number of laminated layers because the thicknesses of the aluminum alloy layers (plates) were even.

Samples were taken from the aluminum alloy clad plates subjected to the T6 treatment, and the content of each of Mg and Zn of each sample, the content being the average composition of that sample, the average grain size at the thickness center of each of the laminated aluminum alloy layers, the DSC characteristics, and presence of the Mg—Zn interdiffusion region, in which Mg and Zn interdiffused between the laminated aluminum alloy layers, were measured by the following methods.

Average Grain Size

The average grain size of the laminated aluminum alloy layers of each sample subjected to the T6 treatment was measured. Specifically, first, the concentration distribution of each of Mg and Zn was measured for a section at the thickness center of any of the laminated aluminum alloy layers, and grain size was measured at each of five visual fields in that section through observation by a light microscope of 100 magnifications. Average grain size at the thickness center of each aluminum alloy layer was obtained from such measurement results. Such average grain sizes at the thickness center of the aluminum alloy layers were averaged for all the laminated aluminum alloy layers, and the resultant value was determined as "average grain size as the average of the grain sizes of the laminated aluminum alloy layers" (μm) defined in claim 1. Table 2 shows the results.

DSC

DSC measurement was performed using DSC220G from Seiko Instruments Inc. as a tester under the same condition: standard substance: aluminum; sample container: aluminum; heating condition: 15 ° C./min; atmosphere: argon (50 ml/min); and sample weight: 24.5 to 26.5 mg. The resultant profile (μW) of the differential scanning calorimetry was divided by the sample weight so as to be normalized (μW/mg). Subsequently, regions, which had horizontal profiles of differential scanning calorimetry within a temperature range of 190° C. or lower and within a temperature range from 220 to 250° C. in the differential scanning calorimetry profile, were each assumed as a reference level 0, and an endothermic peak and an exothermic peak, each of which was able to be identified as a peak having a maximum height from the reference level, were identified.

Interdiffusion Region

The Mg—Zn interdiffusion region of each sample was determined as follows. Five samples were taken from appropriate five portions in a width direction of the clad plate. Concentration of each of Mg and Zn in a thickness direction for a section along the thickness direction of each sample was measured every 1 μm in the thickness direction using an electron beam microanalyzer (EPMA). Existence of the interdiffusion region was determined based on whether the Mg—Zn interdiffusion region, in which the concentration was within a range from 30 to 70% of the maximum content of each of Mg and Zn of the aluminum alloy layer before being subjected to the diffusion heat treatment, existed between the laminated aluminum alloy layers.

As a result, any of inventive examples and comparative examples had the Mg—Zn interdiffusion region between the laminated aluminum alloy layers due to the diffusion heat treatment.

Mechanical Properties

Each of the samples subjected to the T6 treatment was used to measure 0.2% proof stress (MPa) by a tensile test. To evaluate the BH property of the sample subjected to the T6 treatment, the sample was further subjected to heat treatment of 185° C.×20 min simulating paint-bake hardening, and 0.2% proof stress (MPa) of the sample was also measured by a tensile test. Table 2 shows the results.

In the tensile test, each of the samples was machined into a JIS No. 5 test specimen, and was subjected to a room-temperature tensile test, in which a tensile direction was parallel to a rolling direction, and total elongation (%) and 0.2% proof stress (MPa) were measured. The room-temperature tensile test was performed until the test specimen was broken according to JIS 2241 (1980) under a condition of a room temperature of 20° C., a gage length of 50 mm, and a constant tensile speed of 5 mm/min. The total elongation (%) of the clad plate, which had been manufactured (before the T6 treatment), was also measured in the same manner.

In the inventive examples 1 to 14 in Table 2, each of the aluminum alloy layers laminated on an inner side of the aluminum alloy clad plate contains one or both of Mg: 3 to 10 mass % and Zn: 5 to 30 mass %, and the aluminum alloy layer on the outermost layer side has a composition containing Mg in a range from 3 to 10 mass % and Zn that is limited to 2 mass % or less (including 0 mass %).

The aluminum alloy layers are laminated such that aluminum alloy layers having different contents of one of Mg and Zn are adjacently bonded to each other, and the total number of laminated layers is 5 to 15, and the total thickness is 1 to 5 mm.

The aluminum alloy clad plate has average contents of Mg and Zn in ranges of Mg: 2 to 8 mass % and Zn: 3 to 20 mass %. The average content is an average of the contents of each of Mg and Zn of the laminated aluminum alloy layers.

A microstructure of the aluminum alloy clad plate, which has been subjected to the T6 treatment including the diffusion heat treatment under the above-described specific condition, has an average grain size of 200 μm or less, the average grain size being an average of the grain sizes of the laminated aluminum alloy layers, and has an Mg—Zn interdiffusion region, in which Mg and Zn interdiffuse between the laminated aluminum alloy layers. The DSC of the aluminum alloy clad plate shows an endothermic peak at a temperature of 190° C. or lower and the exothermic peak within a temperature range from 220 to 250° C.

As a result, in each inventive example, elongation of the clad plate that has been manufactured (before being subjected to the T6 treatment) is 13% or more, exhibiting good formability. The 0.2% proof stress after the T6 treatment simulating the heat treatment for the structural member shows a high strength, 0.2% proof stress of 400 MPa or more. The 0.2% proof stress after the heat treatment simulating paint baking is further high, showing a good BH property.

On the other hand, the comparative examples 15 to 19 in Table 2 do not satisfy at least one of the requirements defined in the present invention, such as the average grain size and the endothermic peak temperature (position) or the exothermic peak temperature (position) on the DSC of the aluminum alloy clad plate.

As a result, although elongation is large, the 0.2% proof stress after the T6 treatment is extremely low, and the 0.2% proof stress after the heat treatment simulating paint baking is also extremely low, showing a bad BH property.

In the comparative example 15, although a combination of the aluminum alloy layers to be laminated is the same as that of the above-described inventive example, the number of the laminated layers ADA is as small as three. Hence, the average grain size of the laminated aluminum alloy layers is so large as to exceed 200 μm, the endothermic peak on the DSC exceeds 190° C., and the exothermic peak is also so high as to exceed 250° C.

In the comparative examples 16 and 19, each of the aluminum alloy layers to be laminated has a composition including J and/or K in Table 1, which does not meet the defined composition, and thus has an extremely small content of Mg or Zn even in the average composition. The endothermic peak on the DSC is therefore so high as to exceed 190° C.

In the comparative examples 17 and 18, the aluminum alloy layers are not laminated such that the aluminum alloy layers having different contents of one of Mg and Zn are adjacently bonded to each other, but the aluminum alloy layers are laminated such that aluminum alloy layers D or A having the same contents of Mg or Zn are adjacently bonded to each other. The endothermic peak on the DSC is therefore so high as to exceed 190° C.

FIGS. 3 and 4 show typical DSCs of the examples in Table 2 in the Example. FIG. 3 shows the DSC of the inventive example 2. FIG. 3 shows the DSC of the comparative example 18. Such DSCs reveal that the endothermic peak of the inventive example 2 in FIG. 3 is 180° C. that is lower than the defined upper limit 190° C., and the exothermic peak is 240° C. within the defined temperature range from 220 to 250° C. as shown in Table 2. On the other hand, as shown in Table 2, the endothermic peak of the comparative example 18 in FIG. 4 is 215° C. that exceeds the defined upper limit 190° C., and the exothermic peak is 252° C. that exceeds the defined upper limit 250° C.

TABLE 1

| | | Composition of aluminum alloy layer to be laminated (mass %, the remainder: Al) | | | | | | | |
|---|---|---|---|---|---|---|---|---|---|
| Symbol | Alloy system | Mg | Zn | Cu | Si | Fe | Zr | Ag | Ti |
| A | Al—Mg binary | 5.0 | — | — | — | — | — | — | — |
| B | Al—Mg binary | 5.0 | — | — | 0.1 | 0.1 | 0.06 | — | 0.01 |
| C | Al—Mg binary | 8.0 | — | — | 0.05 | 0.1 | 0.06 | — | 0.01 |
| D | Al—Zn binary | — | 20.0 | — | — | — | — | — | — |
| E | Al—Zn binary | — | 10.0 | 2.0 | 0.05 | 0.05 | 0.08 | — | 0.01 |
| F | Al—Zn binary | — | 20.0 | 1.0 | 0.2 | 0.1 | 0.08 | — | 0.01 |
| G | Al—Zn binary | — | 20.0 | 2.0 | 0.2 | 0.1 | 0.08 | — | 0.01 |
| H | Al—Zn binary | — | 20.0 | 1.0 | 0.2 | 0.1 | 0.08 | 0.7 | 0.01 |
| I | Al—Zn binary | — | 30.0 | — | 0.1 | 0.15 | 0.08 | — | 0.01 |
| J | Al—Mg binary | 2.0 | — | — | 0.1 | 0.1 | — | — | 0.01 |
| K | Al—Zn binary | — | 4.0 | 0.2 | 0.1 | 0.1 | — | — | 0.01 |

A sign "—" in Table indicates that the content of the element is equal to or lower than the detection limit, or is substantially 0 mass %.

TABLE 2

| Classification | No. | Number of laminated aluminum alloy layers (layer) | Thickness (mm) | Combination of plates in Table 1 (lamination order: top to bottom) | Average composition (mass %) Mg content | Average composition (mass %) Zn content | Mechanical properties Total elongation (%) |
|---|---|---|---|---|---|---|---|
| Inventive example | 1 | 5 | 1.0 | ADADA | 3 | 8 | 17 |
| | 2 | 5 | 1.0 | AGAGA | 3 | 8 | 13 |
| | 3 | 5 | 1.0 | AHAHA | 3 | 8 | 20 |
| | 4 | 11 | 1.0 | ADADADADADA | 2.73 | 9.1 | 17 |
| | 5 | 13 | 1.0 | ADADADADADADA | 2.69 | 9.23 | 23 |
| | 6 | 5 | 1.0 | CFCFC | 4.8 | 8 | 17 |
| | 7 | 5 | 1.0 | BEBEB | 3 | 4 | 22 |
| | 8 | 5 | 1.0 | BFBFB | 3 | 8 | 18 |
| | 9 | 13 | 1.0 | BFBFBFBFBFBFB | 2.69 | 9.23 | 19 |
| | 10 | 11 | 1.0 | BGBGBGBGBGB | 2.73 | 9.1 | 18 |
| | 11 | 5 | 1.0 | BHBHB | 3 | 8 | 19 |
| | 12 | 11 | 2.0 | BHBHBHBHBHB | 2.73 | 9.1 | 18 |
| | 13 | 13 | 5.0 | BHBHBHBHBHBHB | 2.69 | 9.23 | 18 |
| | 14 | 5 | 1.0 | BIBIB | 3 | 12 | 20 |
| Comparative example | 15 | 3 | 1.0 | ADA | 3.33 | 6.67 | 17 |
| | 16 | 5 | 2.0 | JKJKJ | 1.2 | 1.6 | 26 |
| | 17 | 5 | 1.0 | ADDDA | 2 | 12 | 22 |
| | 18 | 5 | 1.0 | AADAA | 4 | 4 | 25 |
| | 19 | 5 | 1.0 | AKAKA | 3 | 1.6 | 27 |

| Classification | No. | Aluminum alloy layer Average grain size (μm) | DSC characteristic Endothermic peak temperature (°C.) | DSC characteristic Exothermic peak temperature (°C.) | Mechanical properties 0.2% Proof stress (MPa) | BH property 0.2% Proof stress (MPa) |
|---|---|---|---|---|---|---|
| Inventive example | 1 | 192 | 185 | 245 | 408 | 412 |
| | 2 | 165 | 180 | 240 | 447 | 461 |
| | 3 | 158 | 175 | 230 | 451 | 483 |
| | 4 | 182 | 182 | 238 | 440 | 455 |
| | 5 | 168 | 181 | 236 | 462 | 480 |
| | 6 | 188 | 169 | 221 | 468 | 516 |
| | 7 | 191 | 185 | 240 | 402 | 411 |
| | 8 | 178 | 180 | 240 | 420 | 435 |
| | 9 | 165 | 176 | 231 | 442 | 471 |
| | 10 | 178 | 177 | 232 | 419 | 446 |
| | 11 | 193 | 175 | 230 | 453 | 484 |
| | 12 | 184 | 173 | 224 | 465 | 505 |
| | 13 | 162 | 171 | 222 | 478 | 523 |
| | 14 | 184 | 155 | 225 | 446 | 505 |
| Comparative example | 15 | 242 | 204 | 270 | 307 | 261 |
| | 16 | 186 | 210 | 250 | 173 | 143 |
| | 17 | 172 | 208 | 240 | 358 | 341 |
| | 18 | 238 | 215 | 252 | 225 | 200 |
| | 19 | 245 | 214 | 250 | 280 | 245 |

The Example supports the meaning of the requirements of the present invention to achieve the aluminum alloy clad plate having high strength and good formability.

Although the present invention has been described in detail with reference to one specific embodiment, it should be understood by those skilled in the art that various alterations and modifications thereof may be made without departing from the spirit and the scope of the present invention.

The present application is based on Japanese patent application (JP-2015-063101) filed on Mar. 25, 2015, the content of which is hereby incorporated by reference.

INDUSTRIAL APPLICABILITY

According to the present invention, it is possible to provide an aluminum alloy clad plate that resolves the contradiction between a high strength level and formability in a single plate of the existing 7000-series aluminum alloy or the like, and provide an aluminum alloy clad plate having high strength and good formability or a structural member, which is produced by forming of the clad plate, for a transport machine.

The invention claimed is:

1. An aluminum alloy clad plate as a laminate of a plurality of aluminum alloy layers, wherein
each of the aluminum alloy layers laminated inside of an aluminum alloy layer on an outermost layer side of the aluminum alloy clad plate contains one or both of Mg: 3 to 10 mass % and Zn: 5 to 30 mass %, wherein the aluminum alloy layer on the outermost layer side has a composition containing Mg in a range from 3 to 10 mass % and Zn that is limited to 2 mass % or less (including 0 mass %), the aluminum alloy layers are laminated such that aluminum alloy layers having different contents of one of Mg and Zn are adjacently bonded to each other, the total number of laminated layers is 5 to 15, and total thickness is 1 to 5 mm, the aluminum alloy clad plate has an average content of Mg in a range from 2 to 8 mass % and an average content of Zn in a range from 3 to 20 mass %, the average content being an average of the contents of each of Mg and Zn of the laminated aluminum alloy layers, and when the aluminum alloy clad plate is subjected to diffusion heat treatment of holding for 4 hr at 500° C. followed by cooling to room temperature at a cooling rate of 80° C./sec, and subsequently subjected to artificial age hardening of 120° C.×24 hr, the aluminum alloy clad plate has a microstructure having an average grain size of 200 μm or less, the average grain size being an average of grain sizes of the laminated aluminum alloy layers, and having an Mg—Zn interdiffusion region containing Mg and Zn that interdiffuse between the laminated aluminum alloy layers, and a differential scanning calorimetry curve of the aluminum alloy clad plate shows an endothermic peak at a temperature of 190° C. or lower and an exothermic peak within a temperature range from 220 to 250° C.

2. An aluminum alloy clad structural member, the structural member being produced by press-forming the aluminum alloy clad plate according to claim 1 and performing diffusion heat treatment and artificial aging on the press-formed aluminum alloy clad plate, wherein a microstructure of the structural member has an average grain size of 200 μm or less, the average grain size being an average of grain sizes of the laminated aluminum alloy layers, and has an Mg—Zn interdiffusion region containing Mg and Zn that interdiffuse between the laminated aluminum alloy layers, and a differential scanning calorimetry curve of the structural member shows an endothermic peak at a temperature of 190° C. or lower and an exothermic peak in a temperature range from 220 to 250° C.

* * * * *